(No Model.)

C. P. STEINMETZ.
SYSTEM OF ELECTRICAL DISTRIBUTION.

No. 533,245.  Patented Jan. 29, 1895.

WITNESSES
A. F. Macdonald.
B. B. Hull.

INVENTOR
Charles P. Steinmetz
By Geo. R. Blodgett
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 533,245, dated January 29, 1895.

Application filed April 13, 1894. Serial No. 507,385. (No model.)

*To all whom it may concern:*

Be it known that I, CHARLES P. STEINMETZ, a subject of the Emperor of Germany, residing at Schenectady, county of Schenectady, State of New York, have invented a certain new and useful Improvement in Systems of Electric Distribution, of which the following is a specification.

My present invention relates to a system of electrical distribution for multiphase currents, by which currents sixty degrees apart in phase may be converted into currents one hundred and twenty degrees apart in phase, or the reverse. This renders possible the generation and distribution of currents sixty degrees apart in phase, and their conversion into currents differing by one hundred and twenty degrees in phase which are suitable for operating three-phase motors of the ordinary type, or other three-phase translating devices. It is also equally possible, as will be explained hereinafter, to convert monocyclic currents into three-phase currents. Hence by the present invention, monocyclic currents differing by sixty degrees and true three-phase currents become readily convertible the one into the other. Such a system and the means for effecting this conversion, I intend to claim broadly. The conversion of one system into the other is effected by two transformers in which the primary and secondary windings occupy relatively a reversed relation, so that in a sixty-degree system the phase of one of the currents will be changed through an angle of one hundred and eighty degrees, thus occupying a phasal relation with reference to the other two currents such that all three are one hundred and twenty degrees apart.

Figure 1:
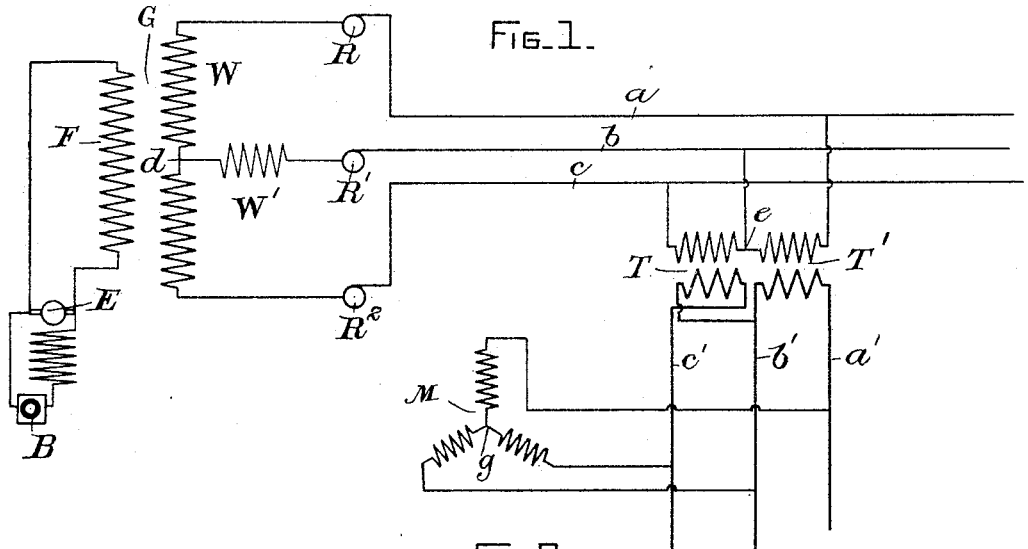
Figure 2:
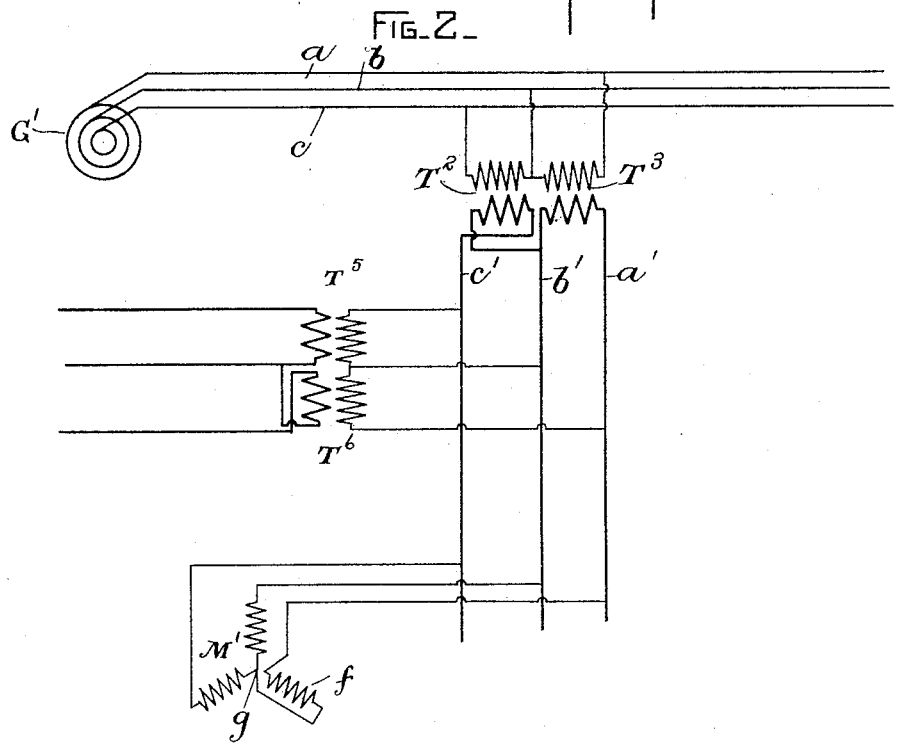

In the accompanying drawings, Figure 1 represents in diagram a system of distribution in which monocyclic currents are converted into three-phase currents, and Fig. 2 represents in a similar manner a system of distribution in which three-phase currents are converted into monocyclic currents.

In Fig. 1, G represents what I term a monocyclic generator provided with a field-exciting coil F, in circuit with a continuous current exciter E, which may be either shunt or series wound. In the diagram it is shown as shunt wound, and is regulated by a resistance B in the shunt circuit. The armature of the generator G, has a main winding W, similar to that employed in ordinary single-phase alternating generators, and a supplementary or phase-modifying coil W', having one terminal connected to a central point $d$ in the main winding. The free terminals of the main and supplementary coils are connected through collector rings and brushes R, R', R$^2$, with three mains $a$, $b$, $c$. The main and supplementary windings are so proportioned that an electromotive force is maintained between the mains $b$, $c$, and $a$, $b$, sixty degrees apart in phase. For converting their currents into three-phase currents, two transformers, T, T', are employed, whose primary coils are joined in series at the point $e$. Their free terminals are connected to two of the mains $a$, $c$, and their connected terminals at the point $e$ are joined to the third main $b$. The secondary windings of the transformers are coupled in a similar manner to mains $a'$, $b'$, $c'$ but one of the secondary coils as, for example, that of transformer T, is reversed, as shown in the diagram. This will result in shifting the electro-motive force maintained between the middle main $b'$ and one of the outside mains through an angle of one hundred and eighty degrees, so that the phasal relation of the electro-motive forces on the secondary side of the transformers will be one hundred and twenty degrees apart instead of sixty degrees apart, as they are on the primary side.

The transformers may be given any desired ratio of transformation, so that the potential of the secondary currents will be changed as well as their phase relation. Instead of reversing one of the secondary coils, the same change of phase may be secured by reversing one of the primary coils. The secondary three-phase currents may be used for operating translating devices of any desired kind and coupled in any desired manner, as, for example, lamps, or three-phase motors.

In the diagram a motor M is shown whose three coils are connected at corresponding terminals to a common joint $g$, and whose free terminals are coupled, respectively, to the mains $a'$, $b'$, $c'$. Any other form of three-phase motor may be substituted for that shown in the diagram. Other translating devices also may be grouped on the mains $a'$, $b'$, $c'$, in any ordinary manner.

In Fig. 2 the generator G' is of the three-phase type, and the electro-motive forces maintained between the mains $a, b, c$ are one hundred and twenty degrees apart in phase. These currents may be converted into a monocyclic system by two transformers, $T^2$, $T^3$, connected in series to the mains $a, b, c$, in a manner similar to the transformers T, T', shown in Fig. 1, and already described. The secondaries of the transformers are connected to mains $a', b', c'$, but the secondary of transformer $T^2$ is reversed, so that the two electro-motive forces between the main $c'$ and the mains $a', b'$ are sixty degrees apart in phase, instead of one hundred and twenty degrees, as is the case on the primary side. The secondary currents may be utilized for operating translating devices in any desired manner.

Motors may be run from all three mains by using a system of transformers, $T^5$, $T^6$, in all respects similar to T, T', as described in connection with Fig. 1, or, by modifying somewhat the construction of the ordinary three-phase motor, they may be connected directly with the mains $a', b', c'$. This modification consists in reversing one of the coils of the motor, as shown at M'. Here the motor has three windings; having one set of terminals connected to a common joint $g$, and their free terminals to the mains, but instead of the arrangement shown at M, one of the coils, namely $f$, is reversed. I do not, however, claim this construction in the present application, but merely illustrate it to explain how motors of this type can be operated from the mains $a', b', c'$, without re-converting the sixty-degree currents which are supposed to flow therein into true three-phase currents.

What I claim, and desire to secure by Letters Patent of the United States, is—

1. The method of electrical distribution herein described, which consists in generating three polyphase currents substantially sixty degrees apart in phase, converting such currents into three currents differing in phase by substantially one hundred and twenty degrees, and utilizing such last named currents for operating translating devices of the ordinary three-phase type, as described.

2. The method herein set forth, which consists in generating electro-motive forces substantially sixty degrees apart in phase, shifting the phase relation of one of the electro-motive forces through an angle of one hundred and eighty degrees and thereby changing it from a sixty-degree relation to the other electro-motive forces to a one-hundred-and-twenty-degree relation or the reverse, as described.

3. The combination of a three-main interconnected polyphase circuit, with means for maintaining between such mains electro-motive forces substantially sixty degrees apart in phase, with a transformer connected on one side to said mains, and on the other side to a corresponding set of mains, and means for changing the phase relation of the transformed currents from sixty degrees to one hundred and twenty degrees, or vice versa, as described.

4. The combination of a source of polyphase currents sixty degrees apart in phase, with a combined transformer and phase converter reducing the potential of the currents, and converting them into currents one hundred and twenty degrees apart in phase, as described, and motors or other translating devices of the ordinary three-phase type operated by such transformed currents.

5. The combination in a system of distribution, of a generator of the alternating-current type provided with a phase-modifying coil, and maintaining in a three-main interconnected circuit electro-motive forces sixty degrees apart in phase, with an interconnected system of transformers, as described, transforming and converting the phase relation of the currents from sixty degrees into one hundred and twenty degrees, as described.

6. The combination in a polyphase distribution system, of two transformers having their respective primary and secondary windings coupled in series and arranged in inverse relation to one another, as described, with circuit connections joining the free and connected terminals of the transformers, respectively, with the mains of a polyphase distribution system.

7. The combination of an interconnected system of transformers coupled in series and having the primary or secondary winding of one of the transformers reversed, as described, with circuit connections to the mains of a polyphase distribution system, whereby the phase relations of the transformed currents are altered, as set forth.

In witness whereof I have hereunto set my hand this 10th day of April, 1894.

CHARLES P. STEINMETZ.

Witnesses:
 B. B. HULL,
 GENEVEIVE HAYNES.